United States Patent
Manno

(10) Patent No.: US 7,506,672 B2
(45) Date of Patent: Mar. 24, 2009

(54) CEMENT SLURRY COLLECTION CHUTE BASIN

(76) Inventor: Joseph J. Manno, 2329 Rue de Anne, La Jolla, CA (US) 92037

( * ) Notice: Subject to any disclaimer, the term of this patent is extended or adjusted under 35 U.S.C. 154(b) by 0 days.

(21) Appl. No.: 12/058,405

(22) Filed: Mar. 28, 2008

(65) Prior Publication Data

US 2008/0175092 A1   Jul. 24, 2008

Related U.S. Application Data

(63) Continuation-in-part of application No. 10/537,140, filed on Jun. 1, 2005.

(51) Int. Cl.
   *B65B 1/04* (2006.01)
   *B08B 3/04* (2006.01)
(52) U.S. Cl. .............................. 141/86; 141/1; 141/85; 141/98; 134/104.4
(58) Field of Classification Search ................ 141/1, 141/85, 86, 98; 209/420, 421; 134/104.4, 134/111, 168 R, 169 R
See application file for complete search history.

(56) References Cited

U.S. PATENT DOCUMENTS

| | | | | |
|---|---|---|---|---|
| 2,050,774 A | * | 8/1936 | Wilcox | 193/4 |
| 3,746,140 A | * | 7/1973 | Schiffelbein | 193/5 |
| 4,007,821 A | * | 2/1977 | Schiffelbein | 193/4 |
| 4,205,411 A | * | 6/1980 | Cupp et al. | 15/257.06 |
| 5,400,916 A | * | 3/1995 | Weber | 220/495.02 |
| 5,511,279 A | * | 4/1996 | Ippolito | 15/257.06 |
| 5,685,978 A | * | 11/1997 | Petrick et al. | 210/241 |
| 6,106,141 A | * | 8/2000 | Bruun | 366/68 |
| 6,155,277 A | * | 12/2000 | Barry | 134/104.4 |
| 6,782,925 B2 | * | 8/2004 | Raposo et al. | 141/5 |
| 7,117,995 B2 | * | 10/2006 | Connard, III | 209/421 |

* cited by examiner

*Primary Examiner*—Timothy L Maust

(57) ABSTRACT

The present application is directed at a cement slurry collection chute basin that incorporates a leak proof means, no matter what the size or condition of the end of the concrete flop chute. By using a forward angled entry trough with a square large basin area having the attachment hooks in a forward position, the weight is put in the rear and the forward edge of the device is held forward of the end flange and tight against the lower surface of the concrete chute. A screen separates the aggregate from the cement slurry, which flows out a drain orifice in the bottom. An alternate embodiment is constructed from "half-pipe" housing. This alternate embodiment cement slurry collection chute basin will be much more efficient and economical to manufacture because of the "half-pipe" construction and the ease with which it could be welded and fabricated into form.

16 Claims, 4 Drawing Sheets

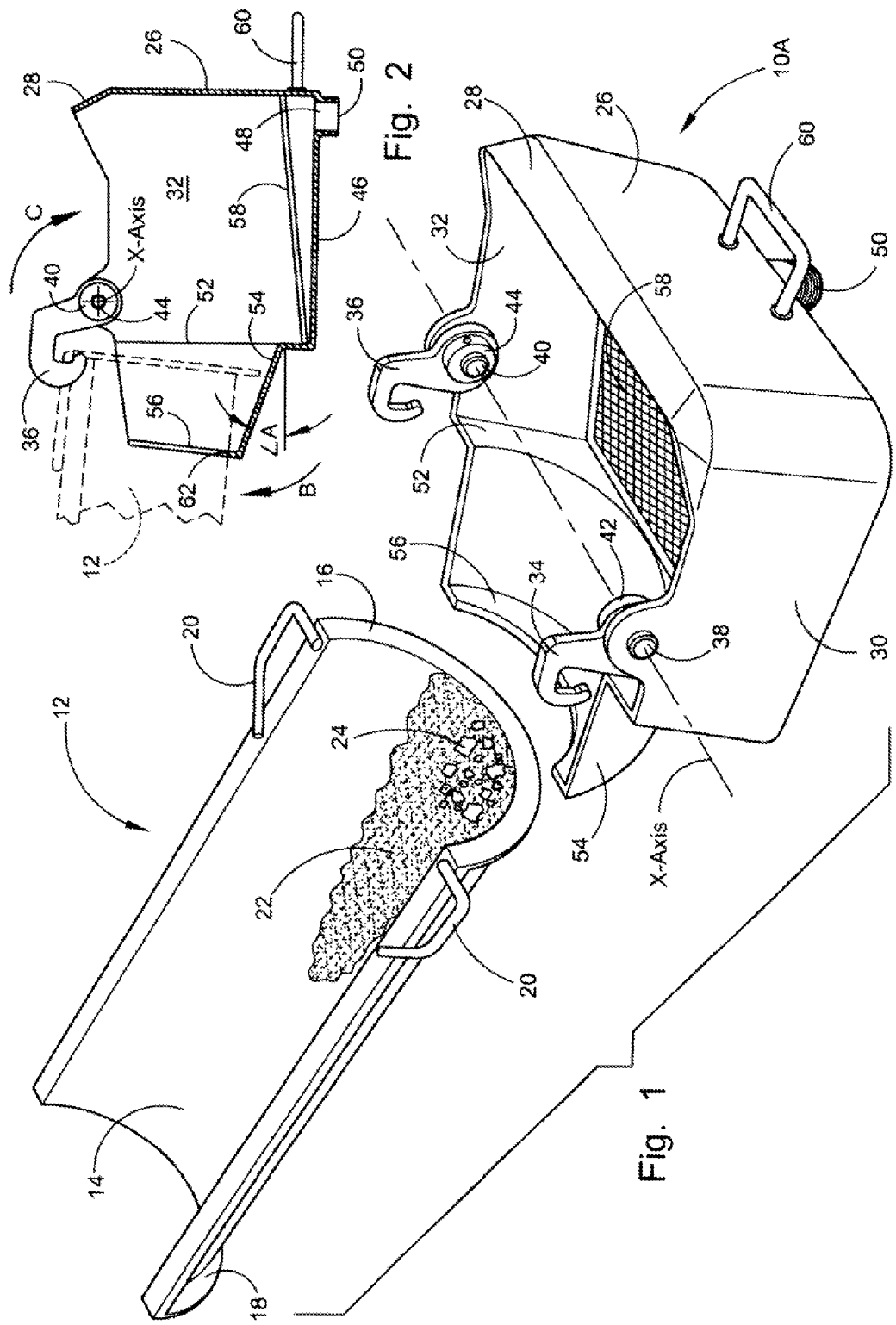

CEMENT SLURRY COLLECTION CHUTE BASIN

This U.S. patent application claims the benefit of, and is a Continuation-In-Part (CIP) of U.S. patent application Ser. No. 10/537,140 filed on Jun. 1, 2005, which claims the benefit of PCT patent application serial no. PCT/US05/08736 filed on Mar. 16, 2005, which in turn claims the benefit of U.S. provisional patent application Ser. No. 60/638,325 filed on Dec. 21, 2004.

FIELD OF THE INVENTION

This application relates in general to an apparatus and method for the collection of cement slurry and aggregates from a concrete mixing truck at a construction site. In particular, the present invention deals with the recovery of cement slurry and aggregates exiting in the flop chutes and other equipment used in the delivery of the cement to the construction site, by providing a leak-proof cement slurry collection chute basin.

BACKGROUND OF THE INVENTION

Concrete is frequently delivered to a construction site in a concrete mixer truck. The truck may have a rotating drum in which the components of concrete are mixed in route to the site. The concrete is formed by mixing cement and various aggregates, such as sand and gravel, with water to form a concrete mixture. At the site, the concrete is poured from the rotating drum onto a surface generally through one or more chutes, which are typically part of the concrete mixer truck. Once the delivery of the concrete is complete, the chute and other components may be coated with residual concrete material. This residual concrete material should be cleaned off the chute and any other components of the concrete mixer truck in order to prevent hardening of the concrete in place.

Concrete delivery trucks have a supply of water to be added in the mixing process and to be used for cleaning up if necessary. In cleaning the flop chute and other components, water may be sprayed onto the flop chute to mix with the concrete creating cement slurry. The run-off of the cleaning process may be environmentally controlled for at least some applications. For example, it may be desirable to prevent or limit the runoff of the cement slurry and aggregates onto the ground, as the run-off materials may constitute a serious environmental hazard. Further, the run-off materials may constitute lost resources to the concrete provider.

Enforcement of environmental regulations at construction sites is becoming increasingly stringent and hence it is anticipated that this issue will become more prominent in the future. Additionally, concrete is often delivered to residential sites where there is no location to dispose of the residual concrete materials.

Some concrete supply companies have developed truck-mounted wash-off containment systems in an attempt to address this problem. However, existing systems are unreliable and are not user-friendly.

Numerous innovations for the collection of cement slurry and aggregates from concrete mixing and delivery trucks have been provided in the prior art that is described as follows. Even though these innovations may be suitable for the specific individual purposes to which they address, they differ from the present application as hereinafter contrasted. The following is a summary of those prior art patents most relevant to the application at hand, as well as a description outlining the difference between the features of the present design and those of the prior art.

U.S. Pat. No. 5,605,398 of Jeff Cronquist describes a rigid cover attached to the chute of a cement truck that can prevent the accidental discharge of cement residue from the chute of the cement truck while the truck is moving. The use of a rigid cover prevents the bending of the cover under the weight of the cement residue. The rigid cover can be attached to an over-chute portion of the chute such as when the over-chute rests upon the main chute; the rigid cover can be positioned to prevent the accidental discharge of cement from the chute or can be flopped on top of the over-chute. The rigid cover is designed to hold back a substantial amount of cement residue.

This patent describes a rigid cover attached of the concrete chute to stop any spillage from the chute during transport, but it does not involve the process of cleaning and recycling the cement slurry that has been washed from the chute or the implements involved with the delivery of the concrete to the construction site.

U.S. Pat. No. 5,741,065 of Foyster G. Bell et al. describes a system, method and apparatus for cleaning a mixing truck by removing and recycling any non-delivered material. In one exemplary system, the invention is preferably attached to a mixing truck having at least one delivery chute and a loading hopper. A rail is configured to be attached to the mixing truck so that the bottom end is near a ground surface and the top end is near the loading hopper. The system further comprises a canister that is movable between the delivery chute and the rail. A lifting mechanism is movably attached to the rail and includes a securing device so that the lifting mechanism may secure and transport the canister along the rail. In this manner, material remaining in the delivery chute may be washed into the canister when positioned below the chute. The canister may then be moved near the rail and secured to the lifting mechanism, which in turn transports the canister to the loading hopper where the contents may be emptied.

This patent describes a system for the recovery of the concrete left in the chutes. This indicates the need for such an apparatus, but does not address the feet that most of the areas that concrete is delivered is on rough, uneven dirt surfaces where rolling a heavy container across would not be easy, if not impossible. This apparatus would also involve a major adaptation to all the delivery trucks that would not be practical.

U.S. Pat. No. 5,927,461 of John W. Jamieson describes a mechanical device for automatically positioning a closure plate for sealing the opening created by the folding of adjacent segments of an articulated chute to thereby prevent undesired discharge or leakage from the chute is provided. The device, which is particularly useful on cement trucks, includes a closure plate rotatably connected to one segment of the chute and disposed to articulate upon an adjacent segment of the chute so that the closure plate seals the opening when the chute is in a folded configuration and, when the segments are unfolded to deliver a charge, rotates to a position clear of the discharge path. The device also includes means for sealably biasing the closure plate toward the opening when the segments are folded and for biasing the closure plate away from the discharge path when the segments are in an unfolded position.

This patent describes another device for closing off the end of the concrete chutes during transport. These devices are generally difficult to keep watertight and allow some of the water and concrete slurry to leak out which is now becoming more of an environmental problem than it has been in the past and can be a hazard on the highways.

U.S. Pat. No. 6,155,277 of C. Marvin Barry describes This application relates to an apparatus for containing and filtering rinse water, sediment and aggregate resulting from washing the hopper and discharge chute components of a concrete truck at a construction site following use. The apparatus comprises a container removably mountable on the end of the discharge chute, the container having an open upper end, a screen removably positionable within the container and an outlet located in a lower portion of the container below the screen. The apparatus further includes a pump mountable on the truck, the pump having a suction hose extending between, the container outlet and the pump, and a discharge hose extending from the pump to an open end discharging into the mixing drum. When the pump is operating, rinse water and relatively small particle size sediment are flushed down the chute and into the container is automatically conveyed through the suction and discharge hoses into the mixing drum. The screen has openings approximately ¼ inch in diameter to trap relatively large particle size aggregate thereby preventing clogging of the pump fittings. The apparatus avoids the need for a designated truck wash-off station at the construction site and prevents contamination of the site or adjoining waterways with cementation debris.

This patent describes a complete system presently in use on many concrete trucks, but the removable container attached to the end of the concrete chute is difficult to use due to the attachment means, and it does not provide a spill proof means of cleaning the chute.

U.S. Pat. No. 6,782,925 of Manuel Marques Raposo discloses a method and system of recovering concrete which includes admitting a concrete slurry to a tank, pressurizing the tank with a fluid under pressure, discharging through a discharge line the pressurized fluid-slurry from the tank, cleaning the tank by admitting a cleaning liquid into the tank after discharging fluid-slurry there from, and discharging the cleaning liquid from the tank through the discharge line for cleaning purposes.

This patent tells of another complete system presently in use on many concrete trucks, but the removable container attached to the end of the concrete chute is also difficult to use due to the attachment means, and it does not provide a spill proof means of cleaning the chute.

None of the foregoing prior art teaches or suggests the particular unique features of the cement slurry collection chute basin. It therefore would be desirable to provide environmentally sound and economically practical apparatus that would greatly reduce or eliminate the drawbacks previously encountered with the presently existing devices.

In this respect, before explaining at least one embodiment of the cement slurry collection chute basin in detail it is to be understood that the design is not limited in its application to the details of construction and to the arrangement of the components set forth in the following description or illustrated in the drawings. The cement slurry collection basin is capable of other embodiments and of being practiced and carried out in various ways. In addition, it is to be understood that the phraseology and terminology employed herein are for the purpose of description and should not be regarded as limiting. As such, those skilled in the art will appreciate that the conception, upon which this disclosure is based, may readily be utilized as a basis for designing of other structures, methods and systems for carrying out the several purposes of the present design. It is important, therefore, that the claims be regarded as including such equivalent construction insofar as they do not depart from the spirit and scope of the present application.

SUMMARY OF THE INVENTION

The principal advantage of the cement slurry collection chute basin is to keep from discarding concrete slurry randomly at construction sites.

Another advantage of the cement slurry collection chute basin is that it has a spill proof attachment means.

Another advantage of the cement slurry collection basin is to separate the concrete slurry from the larger aggregate that could potentially obstruct the slurry flow through the discharge hose.

Another advantage to the cement slurry collection chute basin is by separating the aggregate from the rinse water and the concrete slurry it is then easier to discharge back into the trucks mixing drum.

Another advantage to cement slurry collection chute basin is that it can be adjusted to fit on a variety of different styles of concrete flop chutes and still have the leak proof means.

And yet another advantage is that the cement slurry collection chute basin with the off-center attachment hooks maintains the weight at the back, keeping the forward section tilted up against the flop chute, eliminating any spillage no matter what the size or shape of the end of the concrete flop chute is.

A further advantage in the cement slurry collection chute basin is that it needs no rubber seal between the cement slurry collection basin and the concrete flop chute.

A further advantage is that when the cement slurry collection chute basin is attached to the chute, it can easily be moved about by the means of the hydraulic mechanism controlling the cement chute.

Another advantage to the cement slurry collection chute basin is that the aggregate can be reused on the construction site and the concrete slurry can be taken back to the plant producing two recycled products instead of one environmental hazard.

The foregoing has outlined some of the more pertinent advantages of the cement slurry collection basin. These advantages should be construed to be merely illustrative of some of the features and applications of the intended design. Many other beneficial results can be attained by applying the disclosed cement slurry collection basin in a different manner or by modifying the invention within the scope of the disclosure. Accordingly, other objects and a fuller understanding of this application may be had by referring to the summary of the cement slurry collection basin and the detailed description of the preferred embodiment in addition to the scope of the disclosure defined by the claims taken in conjunction with the accompanying drawings.

The cement slurry collection chute basin is attached to the metal flop chutes that are standard on all concrete mixer trucks. The metal flop chute on a concrete mixer truck provides the means by which concrete is dispensed from the concrete mixer truck at a construction site. After the concrete is poured, the permanently attached standard flop chute and the other chutes that have been attached to lengthen the delivery of the concrete must be washed out immediately with water to remove the concrete residue that remains in the chutes. This water and concrete washed down mixture is called cement slurry. Cement slurry is an extremely toxic liquid that causes incalculable harm if allowed to enter the ecosystem.

The cement slurry collection chute basin, when attached to the standard flop chute is designed to capture and hold the washed down aggregate, allowing the toxic slurry to flow into a holding tank or back into the mixing drum. It is imperative that the toxic liquid cement slurry does not leak out of the flop chute, thereby creating a potential ecological hazard.

The cement slurry collection chute basin incorporates a stepped multi-level basin design that functions as a barrier eliminating the possibility of leakage. The design of the cement slurry collection chute basin insures that there will be an exact alignment with the end of the flop chute no matter what the size.

The cement slurry collection chute basin has been designed to be compatible with various flop chute models; a feature made possible by the stepped, multi-level design and the adjustable mounting hooks that can be moved to fit most standard concrete truck flop chute mounting brackets.

The cement slurry collection chute basin can be manufactured in a variety of configurations and still remain within the scope of this application with the preferred embodiment being in a rectangular shape with a flat bottom and an alternate embodiment being in a curved shape with a flat back side. Both the preferred and the alternate embodiments will have the same elements and advantages in the recycling of the cement slurry and aggregate materials.

With respect to the above description then, it is to be realized that the optimum dimensional relationships for the parts of the cement slurry collection chute basin, to include variations in size, materials, shape, form, function and manner of operation, assembly and use, are deemed readily apparent and obvious to one skilled in the art. All equivalent relationships to those illustrated in the drawings and described in the specification are intended to be encompassed by the present design. Therefore, the foregoing is considered as illustrative only of the principles of the cement slurry collection chute basin. Further, since numerous modifications and changes will readily occur to those skilled in the art, it is not desired to limit the design to the exact construction and operation shown and described, and accordingly, all suitable modifications and equivalents may be resorted to, falling within the scope of the application.

BRIEF DESCRIPTION OF THE DRAWINGS

The accompanying drawings, which are incorporated in and form a part of this specification, illustrate embodiments of the cement slurry collection chute basin and together with the description, serve to explain the principles of this application.

FIG. 1 depicts an exploded perspective view of the preferred embodiment of the cement slurry collection chute basin adjacent to a conventional concrete chute.

FIG. 2 depicts a side section view of the cement slurry collection chute basin.

Figure 3:
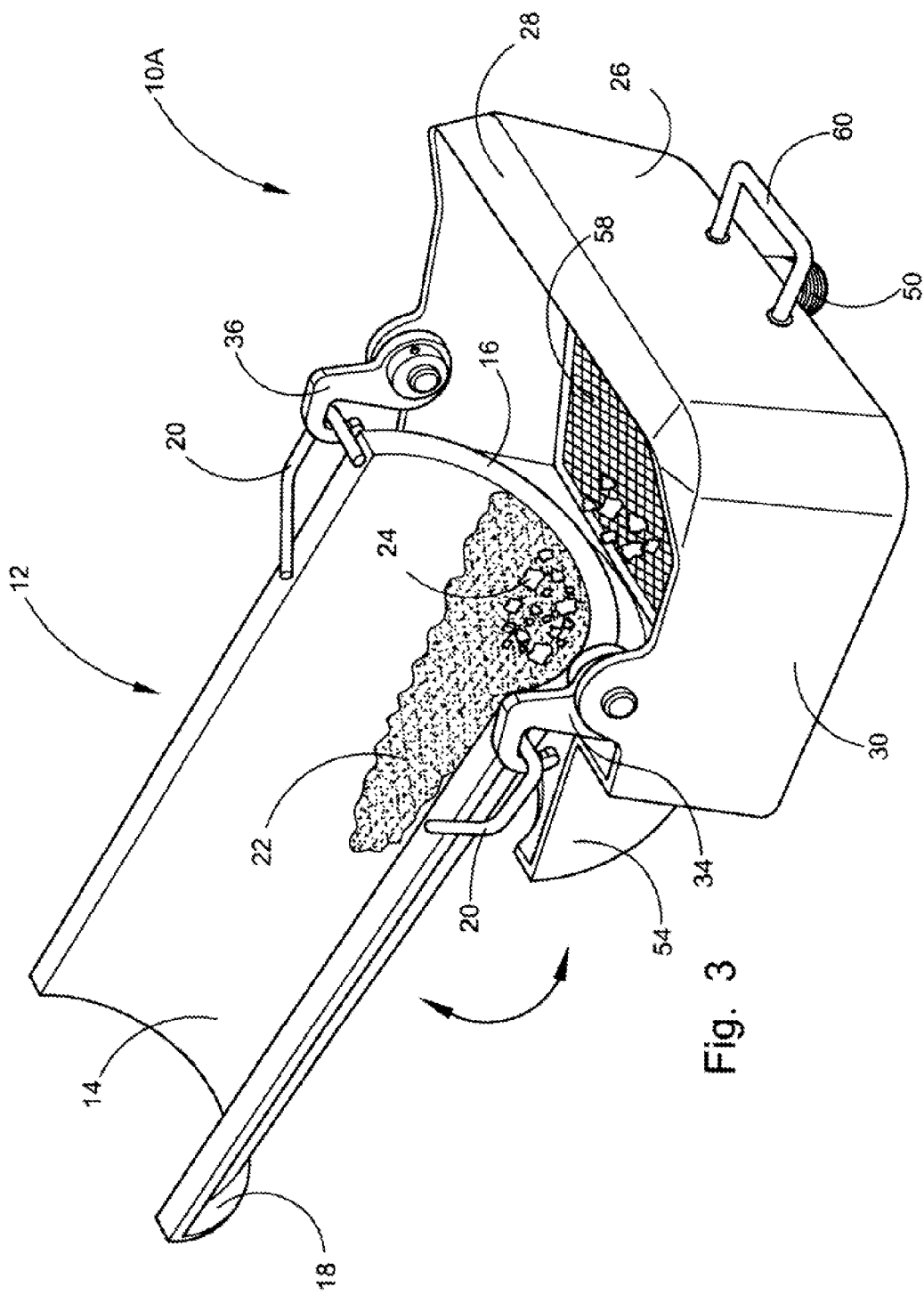
FIG. 3 depicts a perspective view of the cement slurry collection chute basin attached to a conventional concrete flop chute.

For a fuller understanding of the nature and objects of this application, reference should be had to the following detailed description taken in conjunction with the accompanying drawings which are incorporated in and form a part of this specification, illustrate embodiments of the design and together with the description, serve to explain the principles of this application.

DETAILED DESCRIPTION OF THE PREFERRED EMBODIMENTS

Referring now to the drawings, wherein similar parts of the preferred embodiment of the cement slurry collection chute basin 10A and the alternate embodiment of the cement slurry collection chute basin 10B are identified by like reference numerals. There is seen in FIG. 1 an exploded perspective view of the cement slurry collection chute basin 10A adjacent to a conventional concrete flop chute 12 attached to a concrete delivery truck. Concrete flop chutes 12 consist of a curved trough 14 with mating flanges 16 and 18 at each end. Two handles 20 are used to carry the chutes, and to attach to additional chutes when lengthening the dispensing capability. After the delivery has been completed, the concrete flop chutes 12 have a residue of a wet cement mixture referred to as cement slurry 22 and small gravel called aggregate 24. This aggregate 24 will be separated from the slurry 22 by a screen 58. The cement slurry 22 will continue through the screen 58 without the aggregate 24 to be discharged back into the mixing drum of the truck or into a holding tank, but the aggregate 24 must be separated out to facilitate the flow of the slurry 22.

The cement slurry collection chute basin 10A shown in FIG. 1 consists of rear wall 26 with a splash diverter 28 at the upper edge. Sidewalls 30 and 32 incorporate the attachment hooks 34 and 36 held in position by the means of the pivot pins 38 and 40. Shaft locking collars 42 and 44 are used to position the attachment hooks 34 and 36 which are allowed to pivot about the X-Axis. The bottom surface 46 of the cement slurry collection chute basin 10A is slightly tapered to a drain orifice 48 having a threaded drain nipple 50. The front wall 52 has a slanted stepped trough 54 attached, with the stepped trough 54 having a forward flange 56. The optimum slant angle A will be twenty degrees but may vary between ten and thirty degrees and still remain within the scope of this application. This slant Angle A of the slanted stepped trough 54 assures that all the material in the concrete flop chute 12 will enter the cement slurry collection chute basin 10A to the rear of the forward flange 56. The weight of the material entering the cement slurry collection chute basin 10A is deposited behind the X-Axis keeping pressure on the forward flange 56 against the lower surface of the curved trough 14 of the concrete flop chute 12. An aggregate screen 58 is attached to the bottom of the concrete slurry chute basin 10A on an angle to retain the concrete aggregate 24 and allow the cement slurry 22 to flow freely into the drain orifice 48 as best seen in FIG. 2, and through drain nipple 50. After being washed the cement aggregate 24, does not pose an environmental problem and can be reused as a base material on the construction site. Handle 60 is attached on the outside of the rear wall 26 to be used for carrying and positioning the cement slurry collection chute basin 10A on the concrete flop chute 12.

FIG. 2 depicts a side section view of the cement slurry collection chute basin 10A illustrating the upward rotational pressure B and the downward pressure C about the X-Axis when the discharge enters the cement slurry collection chute basin 10A. This view clarifies the position where the forward flange edge 62 of the forward flange 56 of the slanted stepped trough 54 is pressed against the lower surface of the curved trough 14 of the concrete flop chute 12.

FIG. 3 depicts a perspective view of the cement slurry collection chute basin 10A attached to a conventional concrete flop chute 12 with the cement slurry 22 and concrete aggregate 24 flowing into the cement slurry collection chute basin 10A with the concrete aggregate 24 being retained by the aggregate screen 58. The cement slurry collection chute basin 10A shown here is partially swung away from the flop chute 12, but in operation because of its weight forward of the attachment hooks 36, the cement slurry collection chute basin 12 would rest snugly on the lower surface of the flop chute 12, such that movement would swing about the arrow shown.

Figure 4:
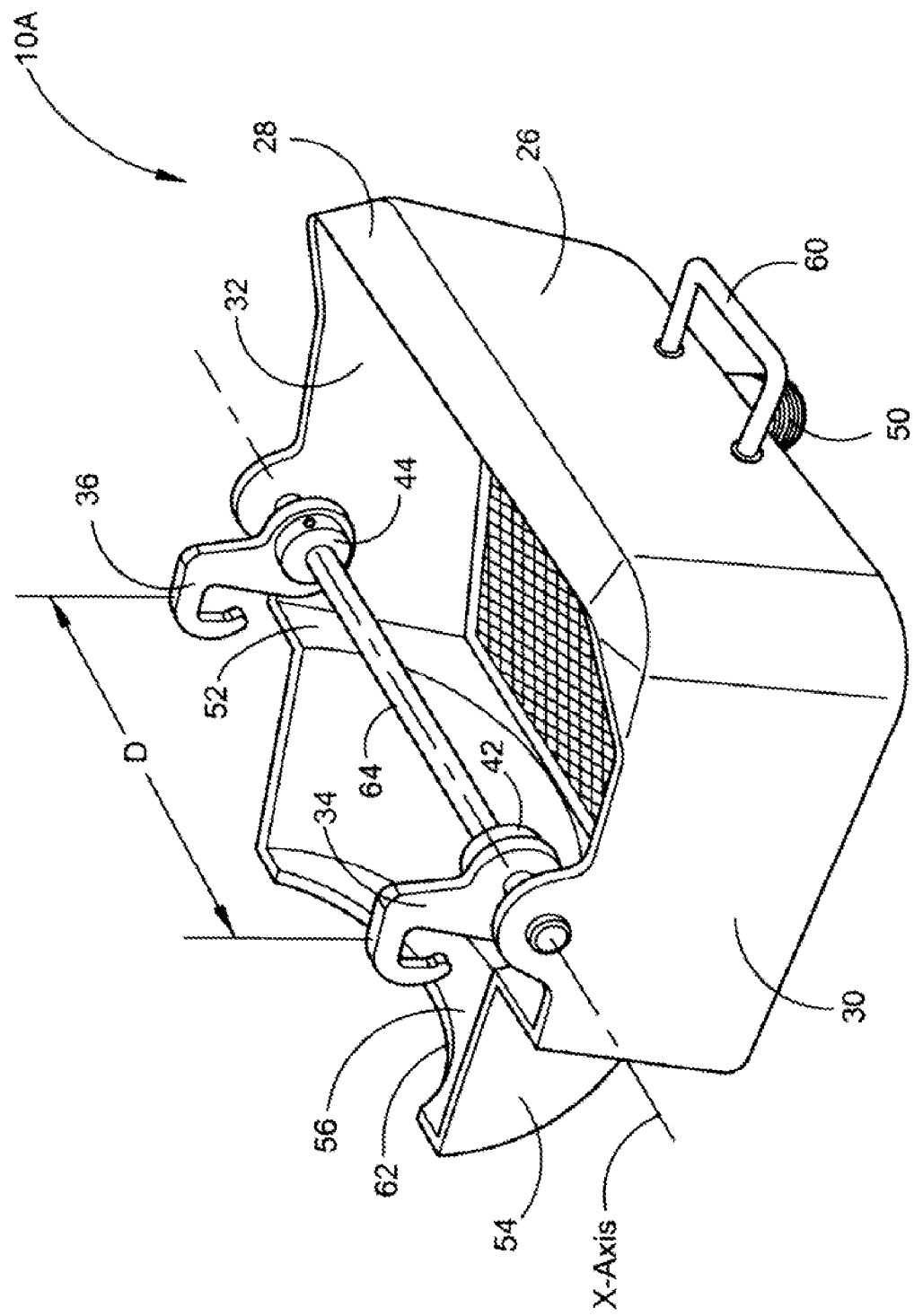
FIG. 4 depicts a perspective view of the cement slurry collection chute basin with adjustable hooks on a fixed rod.

FIG. 4 depicts a perspective view of the cement slurry collection chute basin 10A with adjustable attachment hooks 34 and 36 on a fixed rod 64 where they can be adjusted anywhere along the length D. The fixed rod 64 replaces the pivot pins 38 and 40

Figure 5:
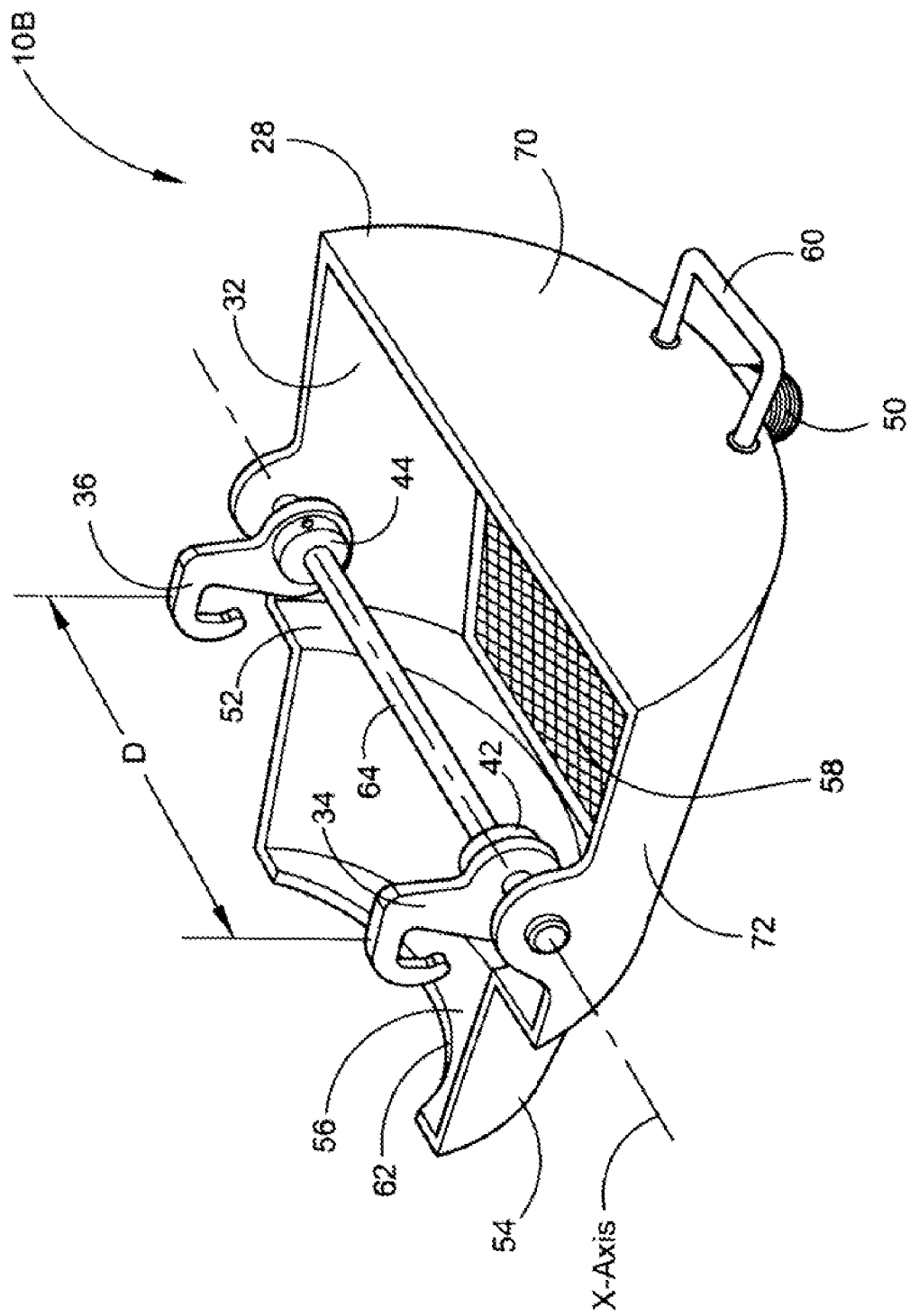
FIG. 5 depicts a perspective view of the alternate embodiment of the cement slurry collection chute basin with adjustable hooks on a fixed rod.

The alternate embodiment of the cement slurry collection chute basin 10B shown in FIG. 5 consists of rear wall 70. The sidewalls and bottom comprise a "half pipe" curved shape housing 72 that incorporates the attachment hooks 34 and 36 on a fixed rod 64 where they can be adjusted anywhere along the length D. The fixed rod 64 replaces the pivot pins 38 and 40. Shaft locking collars 42 and 44 are used to position the attachment hooks, 34 and 36 which are allowed to pivot about the X-Axis. The bottom of the curved shape housing 72 incorporates the threaded drain nipple 50. The front wall 52 has a slanted stepped trough 54 attached, with the stepped trough 54 having a forward flange 56. Forward flange 56 terminates with forward flange edge 62. The optimum slant Angle A will be twenty degrees but may vary between ten and thirty degrees still remaining within the scope of this application. This slant Angle A of the slanted stepped trough 54 assures that all the material in the concrete flop chute 12 will enter the cement slurry collection chute basin 10B to the rear of the forward flange 56. An aggregate screen 58 is attached on the bottom of the concrete slurry chute basin 10B. Handle 60 is attached on the outside of the rear wall 70 to be used for carrying and positioning the cement slurry collection chute basin 10B.

This alternate embodiment cement slurry collection chute basin 10B shown in FIG. 5 will be much more efficient and economical to manufacture because of the "half-pipe" construction and the ease with which it could be welded and fabricated into form.

The cement slurry collection chute basins 10A and 10B shown in the drawings and described in detail herein disclose arrangements of elements of particular construction and configuration for illustrating preferred embodiments of structure and method of operation of the present design. It is to be understood, however, that elements of different construction and configuration and other arrangements thereof, other than those illustrated and described may be employed for providing a cement slurry collection chute basins 10A and 10B in accordance with the spirit of this application. Such changes, alternations, and modifications as would occur to those skilled in the art are considered to be within the scope of this application, as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the cement slurry collection basin that is measured by the claims nor is it intended to be limiting as to the scope of the application in any way.

I claim:

1. A cement slurry collection chute basin comprising:
   (a) a housing having a front wall, rear wall, bottom wall and side walls for the purpose of containing cement slurry from a cement flop chute;
   (b) a slanted stepped trough extending from and integrated with said front wall, including a forward flange edge for the purpose of extending under the cement flop chute, mating with the bottom surface of the flop chute and thereby preventing cement slurry from spilling therefrom;
   (c) a pair of attachment hooks pivotably attached to said side walls wherein said pair of attachment hooks pivotably attached to said side walls are pivotably attached using a pair of pivot pins having shaft locking collars to secure said attachment hooks and further wherein said pair of attachment hooks pivotably attached to said side walls are pivotably attached using a single fixed rod having shaft locking collars to secure said attachment hooks; and
   (d) a drain orifice and drain nipple located in said bottom wall for allowing water and cement slurry to exit said housing;
   whereby when attached to a cement truck flop chute, the cement slurry collection chute basin collects cement slurry originating from the flop chute and prevents spillage of same.

2. The cement slurry collection chute basin according to claim 1, wherein said forward flange edge on said slanted stepped trough is shaped to make contact with and mate with conventional cement truck flop chutes.

3. The cement slurry collection chute basin according to claim 1, wherein said slanted stepped trough is slanted at an angle to assure that all of the cement slurry leaving the cement truck flop chute will enter the cement slurry collection chute basin.

4. The cement slurry collection chute basin according to claim 3, wherein said slanted stepped trough is slanted at an angle of about 10 degrees to about 30 degrees.

5. The cement slurry collection chute basin according to claim 4, wherein said slanted stepped trough is slanted at an angle of 20 degrees.

6. The cement slurry collection chute basin according to claim 1, wherein said pair of attachment hooks pivotably attached to said side walls are pivotably attached using a single fixed rod having shaft locking collars to secure said attachment hooks, and are position adjustable along the length of said fixed rod to accommodate differing sizes of cement truck flop chutes.

7. The cement slurry collection chute basin according to claim 1, further comprising an aggregate screen extending from said front wall to said rear wall and in contact with said side walls for the purpose of screening out cement aggregate to prevent it from exiting the cement slurry collection chute basin.

8. The cement slurry collection chute basin according to claim 1, wherein said housing further includes a handle.

9. The cement slurry collection chute basin according to claim 1, wherein said drain nipple is threaded.

10. A cement slurry collection chute basin comprising:
   (a) a housing fabricated from a half-pipe having a front wall and a rear wall, a curved bottom wall and side walls for the purpose of containing cement slurry from a cement flop chute;
   (b) a slanted stepped trough extending from and integrated with said front wall, including a forward flange edge for the purpose of extending under the cement flop chute, mating with the bottom surface of the flop chute and thereby preventing cement slurry from spilling therefrom;

(c) a pair of attachment hooks pivotably attached to said side walls wherein said pair of attachment hooks pivotably attached to said side walls are pivotably attached using a pair of pivot pins having shaft locking collars to secure said attachment hooks and further wherein said pair of attachment hooks pivotably attached to said side walls are pivotably attached using a single fixed rod having shaft locking collars to secure said attachment hooks, and are position adjustable alone the length of said fixed rod to accommodate differing sizes of cement truck flop chutes; and (d) a drain orifice and drain nipple located in said bottom wall for allowing water and cement slurry to exit said housing;

whereby when attached to a cement truck flop chute, the cement slurry collection chute basin collects cement slurry originating from the flop chute and prevents spillage of same.

11. The cement slurry collection chute basin according to claim 10, wherein said forward flange edge on said slanted stepped trough is shaped to make contact with and mate with conventional cement truck flop chutes.

12. The cement slurry collection chute basin according to claim 10, wherein said slanted stepped trough is slanted at an angle to assure that all of the cement slurry leaving the cement truck flop chute will enter the cement slurry collection chute basin.

13. The cement slurry collection chute basin according to claim 12, wherein said slanted stepped trough is slanted at an angle of about 10 degrees to about 30 degrees.

14. The cement slurry collection chute basin according to claim 10, further comprising an aggregate screen extending from said front wall to said rear wall and in contact with said side walls for the purpose of screening out cement aggregate to prevent it from exiting the cement slurry collection chute basin.

15. A method for making a cement slurry collection chute basin, comprising the steps of:

(a) providing a housing having a front wall, rear wall, bottom wall and side walls for the purpose of containing cement slurry from a cement flop chute;

(b) integrating a slanted stepped trough with said front wall extending from said front wall, including a forward flange edge for the purpose of extending under the cement flop chute, mating with the bottom surface of the flop chute and thereby preventing cement slurry from spilling therefrom;

(c) pivotably attaching a pair of attachment hooks to said side walls; and (d) providing a drain orifice and drain nipple located in said bottom wall for allowing water and cement slurry to exit said housing;

whereby when attached to a cement truck flop chute, the cement slurry collection chute basin collects cement slurry originating from the flop chute and prevents spillage of same.

16. The method for making a cement slurry collection chute basin according to claim 15, wherein said step of providing a housing further includes the step of providing a housing fabricated from a half-pipe having a front wall and a rear wall, for the purpose of containing cement slurry from a cement flop chute;

whereby said cement slurry collection chute basin fabricated from said half-pipe is more efficiently and more economically fabricated.

* * * * *